(12) United States Patent
Steinhilber (10) Patent No.: US 7,369,354 B2
(45) Date of Patent: May 6, 2008

(54) DEVICE FOR STORAGE OF DATA ON DATA CARRIERS ACCOMMODATED IN CASSETTES

(75) Inventor: Friedhelm Steinhilber, Rottweil (DE)

(73) Assignee: BDT AG, Rottweil (DE)

( * ) Notice: Subject to any disclaimer, the term of this patent is extended or adjusted under 35 U.S.C. 154(b) by 458 days.

(21) Appl. No.: 11/203,797

(22) Filed: Aug. 15, 2005

(65) Prior Publication Data

US 2006/0044672 A1   Mar. 2, 2006

(30) Foreign Application Priority Data

Aug. 25, 2004   (DE) ...................... 10 2004 041 283

(51) Int. Cl.
*G11B 15/68* (2006.01)
(52) U.S. Cl. ....................................................... 360/92
(58) Field of Classification Search .................. 360/92; 369/30.29, 30.36, 178.01
See application file for complete search history.

(56) References Cited

U.S. PATENT DOCUMENTS

| | | | |
|---|---|---|---|
| 4,815,055 A | 3/1989 | Fago, Jr. ....................... 369/36 |
| 6,366,550 B1 * | 4/2002 | Shiba ..................... 369/178.01 |
| 2002/0057519 A1 * | 5/2002 | Porter et al. .................. 360/92 |
| 2002/0172108 A1 * | 11/2002 | Moreira et al. .......... 369/30.36 |
| 2004/0105352 A1 * | 6/2004 | Christie et al. .......... 369/30.29 |
| 2004/0130819 A1 * | 7/2004 | Hoelsaeter et al. ........... 360/92 |
| 2004/0264040 A1 * | 12/2004 | Armagost et al. ............ 360/92 |

FOREIGN PATENT DOCUMENTS

DE    100 55 624 C2    7/2003

\* cited by examiner

*Primary Examiner*—Tianjie Chen
(74) *Attorney, Agent, or Firm*—Baker Botts L.L.P.

(57) ABSTRACT

For storage of data on data carriers accommodated in cassettes (28), a device is used with a magazine, having receptacles for cassettes (28) and with a robot unit (44) for changing the cassettes (28) between the receptacles and a drive (16). The magazine is movable relative to robot unit (44), in order to position the selected receptacle for changing of the cassette (28). For positioning, a sensor unit is provided on robot unit (44) and a light guide element on each receptacle. The light emitted from the light transmitters of the sensor unit is guided via the light guide element to the light receivers of the sensor unit, when they are congruent with the positioning position of the robot unit (44) and receptacle.

20 Claims, 6 Drawing Sheets

DEVICE FOR STORAGE OF DATA ON DATA CARRIERS ACCOMMODATED IN CASSETTES

CROSS-REFERENCE TO RELATED APPLICATION

This application claims priority to German Patent Application No. 10 2004 041 283.9, which was filed on Aug. 25, 2004, and is incorporated herein by reference in its entirety.

TECHNICAL FIELD

The invention concerns a device for storage of data on data carriers accommodated in cassettes.

BACKGROUND

Data carriers, preferably magnetic tapes, diskettes, CD ROM, DVD, etc., are used for automatic storage of large amounts of data. The data carriers are then accommodated in cassettes, in which a number of such cassettes are accommodated in a magazine. A robot unit serves to remove a selected cassette from the receptacle of the magazine or insert it into this receptacle. The magazine with receptacles for cassettes and the robot unit are controlled to move, relative to each other, for this purpose, in order to position the robot unit and the selected receptacle of the magazine in aligned fashion for replacement. Such devices are on the market, for example, under the names Autoloader and Tape-Library. An example of such an autoloader is shown in DE 100 55 624 C2. In order to change the cassettes in the change position from the corresponding receptacle or to the corresponding receptacle, an exact alignment of the selected receptacle in the robot unit is required. This exact alignment requires high mechanical precision in the drive and in the guide of the magazine and the robot unit, which results in significant technical expense, especially with a large storage capacity, i.e., with a large number of cassettes.

SUMMARY

The underlying object of the invention is to design a device of the generic type just mentioned, so that precise alignment of the robot unit and receptacle is possible with lower design demands.

This object can be solved by a device for storage of data on data carriers accommodated in cassettes, with a magazine, having receptacles for the cassettes, and with a robot unit to change the cassettes from the receptacles or into the receptacles, in which the magazine and the robot unit are movable in controlled fashion relative to each other, in order to position the selected receptacle and the robot unit for the change, wherein an optical sensor unit, on the one hand, and a light guide element, on the other, are provided for positioning, one of which is arranged on the robot unit and the other on each receptacle, the sensor unit has at least one light transmitter with a light exit and a light receiver with a light entrance, in which the light exit and the light entrance are spaced from each other, the light guide element has at least one entrance and one light exit, having the same mutual spacing as the light entrance and light exit of the sensor unit, in the change position of the receptacle in the robot unit, the light entrances and light exits of sensor unit and light guide element are congruent, so that the light emitted from the light exit of the light transmitter impinges on the light entrance of the light guide element, is deflected in the light guide element to its light exit and is emitted from this light exit to the light entrance of the light receiver, and receiving of the light emitted from the light transmitter in light receiver is used as a positioning signal.

The object can also be achieved by a device for storage of data on data carriers accommodated in cassettes, comprising a magazine, having receptacles for the cassettes, a robot unit to change the cassettes from the receptacles or into the receptacles, in which the magazine and the robot unit are movable in controlled fashion relative to each other, in order to position the selected receptacle and the robot unit for the change, an optical sensor unit, a light guide element comprising at least one entrance and one light exit, having the same mutual spacing as the light entrance and light exit of the sensor unit, and at least one light transmitter with a light exit and a light receiver with a light entrance, in which the light exit and the light entrance are spaced from each other, wherein in the change position of the receptacle in the robot unit, the light entrances and light exits of sensor unit and light guide element are congruent, so that the light emitted from the light exit of the light transmitter impinges on the light entrance of the light guide element, is deflected in the light guide element to its light exit and is emitted from this light exit to the light entrance of the light receiver, and wherein receiving of the light emitted from the light transmitter in light receiver is used as a positioning signal.

The magazine may be movable in controlled fashion, the robot unit can be arranged fixed, the sensor unit can be arranged on the robot unit, and a light element can be arranged on each receptacle. The robot unit may cause the change between the corresponding receptacle and at least one drive for the data carrier. The magazine may revolve on a closed track around the robot unit, and optionally the at least one drive. The magazine may revolve in a horizontal plane and the cassettes may be accommodated flat in the receptacles parallel to this plane. The magazine may have supports revolving in the horizontal plane, on which at least two receptacles, arranged one on the other, are arranged. At least two receptacles can be re arranged in a box, one on the other, which is releasably fastened to support. The robot unit may have an elevator for positioning at the receptacles and arranged one on the other. The at least one light transmitter can be a light-emitting diode and the at least one light receiver can be a phototransistor. The light guide element may have a light path for positioning and an additional light path for prepositioning, in which the sensor unit, during relative movement of the magazine and robot unit, scans the light path for prepositioning before light path for positioning. The signal for scanning light path for prepositioning can be used for braking or the relative movement of the magazine and robot unit before reaching the target position. The light guide element may have a light path, in addition to light path, for positioning, which is scanned by the sensor unit in the positioning position, and can be interrupted by a blocking element that indicates the presence or absence of a cassette in the corresponding receptacle. The light guide element may have a light path that is scanned by the sensor unit and can be interrupted by an insertable blocking element, in order to mark a selected support of the magazine as initial point for numbering. At least the light paths can be designed for positioning and prepositioning in a one-piece light guide element made of transparent plastic. The light path for monitoring of cassettes, and preferably the light path for marking of the support, can also be made in one piece in the same light guide element. The light transmitters and the light receivers of the sensor unit and the light entry surfaces and light exit surfaces of the light guide elements can be arranged in a plane parallel to the revolving plane of support, the light guide elements are passed by the sensor unit in this plane for positioning of supports, and the sensor unit can be moved past the receptacles, arranged one on the other, perpendicular to the plane of circulation on the light guide elements of receptacles for positioning of the robot unit.

The essential idea of the invention consists of making alignment of the robot unit and the correspondingly selected receptacle of the magazine, independent of the mechanical precision of the guide, owing to the fact that optical positioning is produced in the change position. For this purpose, a sensor unit and a light guide element are used. The sensor unit is preferably arranged on the robot unit, while a light guide element is arranged on each receptacle. The sensor element has a light transmitter and a light receiver at a spacing from it. When the robot unit and the receptacle for the selected cassette are aligned precisely with each in the change position, the light emitted by the light transmitter of the robot unit reaches a light entry surface of the light guide element and is deflected in the light guide element to a light outlet surface arranged opposite the light receiver in the sensor unit. The exact positioning is therefore indicated by the fact that the [light] from the light transmitter of the sensor unit arranged on the robot unit reaches the light receiver of the sensor unit via the light guide element arranged on the receptacle. Incomplete alignment of the change position is recognized in an absent or incomplete light signal.

It is obvious that this function can also be achieved when the light guide element is arranged on the robot unit and a sensor unit is allocated to each receptacle of the magazine. Since only one or a few robot units are present, however, but a fairly large number of receptacles for cassettes, it is expedient to arrange the sensor unit on the robot unit, since the sensor unit must be electrically connected and requires active optoelectronic elements.

It is also obvious that the optical positioning in the change position can be used in the method according to the invention, regardless of whether the robot unit is arranged fixed in the device and the magazine is moved in controlled fashion with the receptacle, or whether a fixed magazine is used and the robot unit is moved in front of the receptacles of the magazine.

In a preferred variant, a magazine is used that is movable on a closed track, in which the robot unit, and preferably one or more drives for the data carriers, are situated within this closed revolving track of the magazine.

In an expedient variant, the cassettes are then arranged lying flat in the plane of the revolving track of the magazine, so that a limited design height of the device is obtained. In order to increase storage capacity, several cassettes can be arranged, stacked one on the other. If several cassettes are stacked one on the other, it is advantageous to arrange the receptacles for these cassettes, lying one on the other, in a box that can be removed from the magazine as a compact unit with the cassettes and insert it into the magazine. Because of this, convenient equipping of the receptacles with cassettes is possible and storage of cassettes outside of the device is facilitated.

If the magazine is moved horizontally, with reference to the robot unit, and also has several receptacles for cassettes stacked one on the other, the robot unit is preferably equipped with an elevator, so that it can be moved in control fashion, in terms of height, in front of the corresponding selected cassette. The optical position can preferably be used here, both for horizontal positioning of the revolving magazine and for height positioning of the robot unit by means of the elevator.

The sensor unit can be implemented with cost-effective optoelectronic components. An LED, especially an infrared diode, is preferably used as light transmitter. A phototransistor can be used as light receiver. The light guide elements are designed in a particularly favorably variant as plastic injection-molded parts.

In addition to the light guide element that defines the exact change position, an additional light guide element can be used to indicate approach to the change position. Drive of a magazine during approach to the change position can be braked by this. It is therefore possible to also move magazines with greater capacity and therefore significant inertia with high speed.

Light guide elements can also be used, in order to mark the magazine locations of starting points for numbering and identification of the magazine locations.

It is also possible to use a light guide element to indicate whether a cassette is situated in a receptacle, or whether the receptacle is empty.

It is then advantageous to combine the light guide paths for these different functions in a single light guide element made of plastic. The sensor unit itself can then be used to query the different light guide paths, and therefore for the different functions.

BRIEF DESCRIPTION OF THE DRAWINGS

The invention is further explained below by means of a practical example depicted in the drawing. In the drawing.

DETAILED DESCRIPTION

In the practical example depicted in the drawing, the device for storage of data is designed as a so-called autoloader, in which magnetic tapes and cassettes serve as data carrier. A number of cassettes are accommodated in a magazine and are removed from the magazine in controlled fashion by a robot unit and introduced to a drive or removed from the drive and placed back in the magazine.

Figure 1:
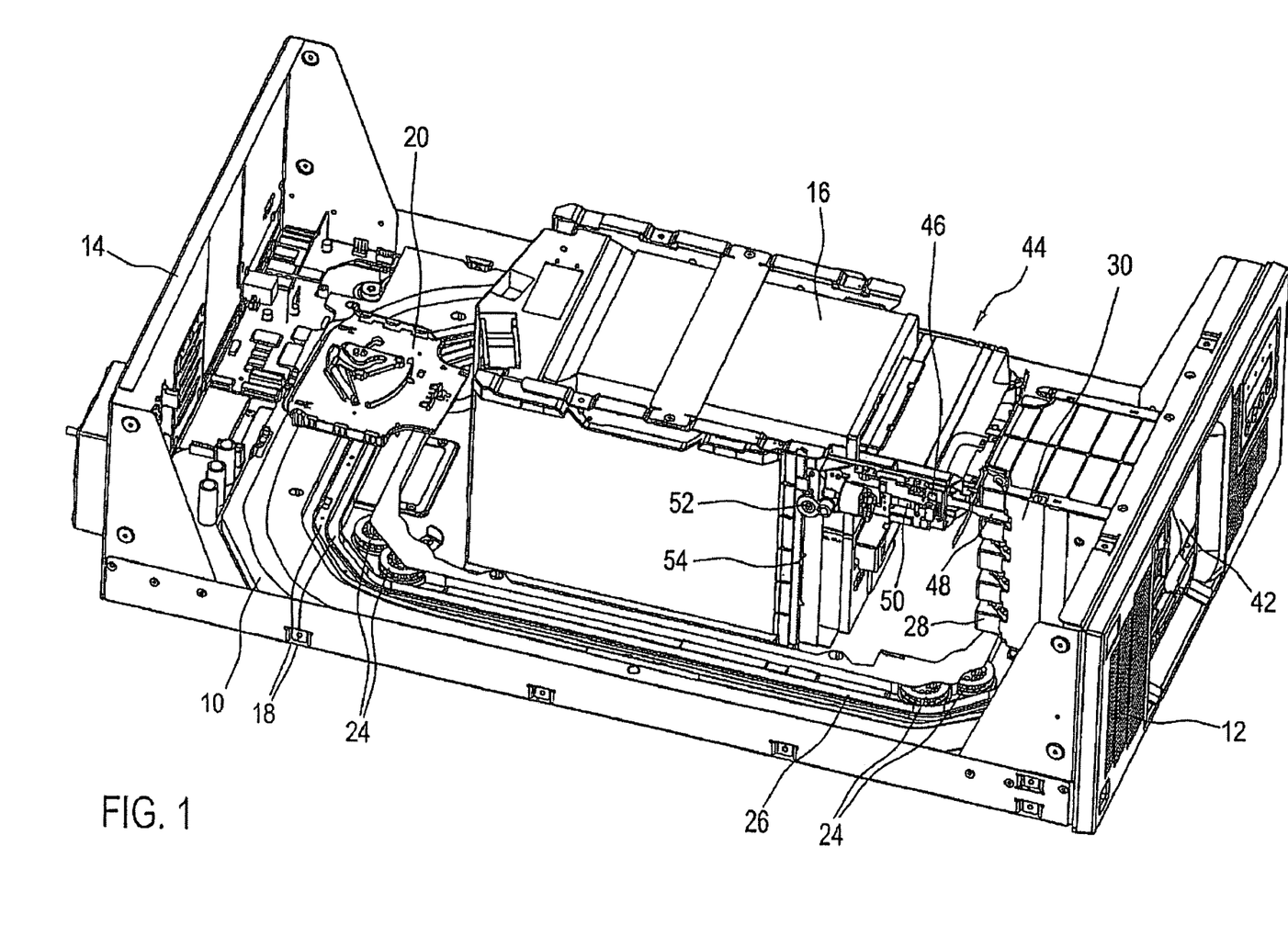
FIG. 1 shows a perspective view of the device with the top of the housing removed.
Figure 2:
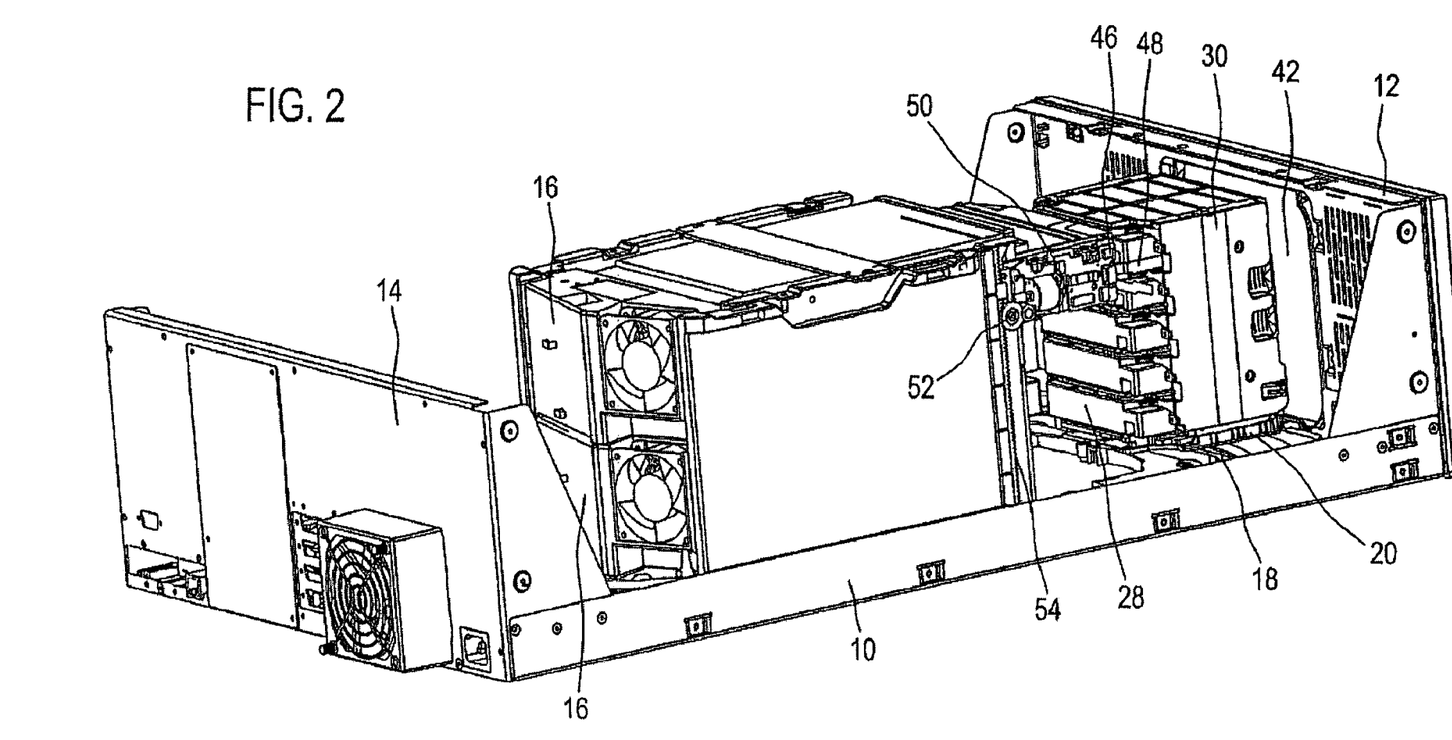
FIG. 2 shows a corresponding perspective view from the rear.

As shown in FIGS. 1 and 2, the device has a housing, which has a bottom plate 10, a front wall 12 and a back wall 14. A cover of the housing, consisting of side walls and a cover plate, is removed in the depiction in FIGS. 1 and 2, in order to permit a view into the interior of the device.

The bottom plate 10 has the shape of an elongated rectangle, on whose narrow sides the front wall 12 and the rear walls 14 are arranged. The width of the housing, and therefore bottom plate 10, is chosen, in particular, so that the device can be used in an ordinary 19" equipment rack.

Two drives 16 for the magnetic tapes are arranged lying flat on each other in the center of bottom plate 10, so that their horizontally arranged cassette shafts are directed against front wall 12. A revolving magazine is arranged on bottom plate 10, which is passed on a closed path around drives 16. For this purpose, guide tracks 18 are formed in bottom plate 10. Plate-like supports 20 of the magazine revolve parallel to the surface of bottom plate 10, which are guided in the guide tracks 18, so that they engage with guide pins 22 molded onto their bottom into the guide track 18. A belt 26 that can be driven by a stepping motor via deflection rolls 24 engages on the bottom of support 20, in order to move it in controlled fashion in the guide tracks 18 around drives 16.

The supports 20 have a surface that corresponds roughly to the size of a flat-lying cassette 28 of magnetic tapes. In the depicted practical example, the magazine has ten supports 20, arranged in succession in the revolving track. Only one support 20 is visible in the depiction of FIG. 1, the additional supports 20 are removed, in order to make the guide tracks 18 visible.

Figure 3:
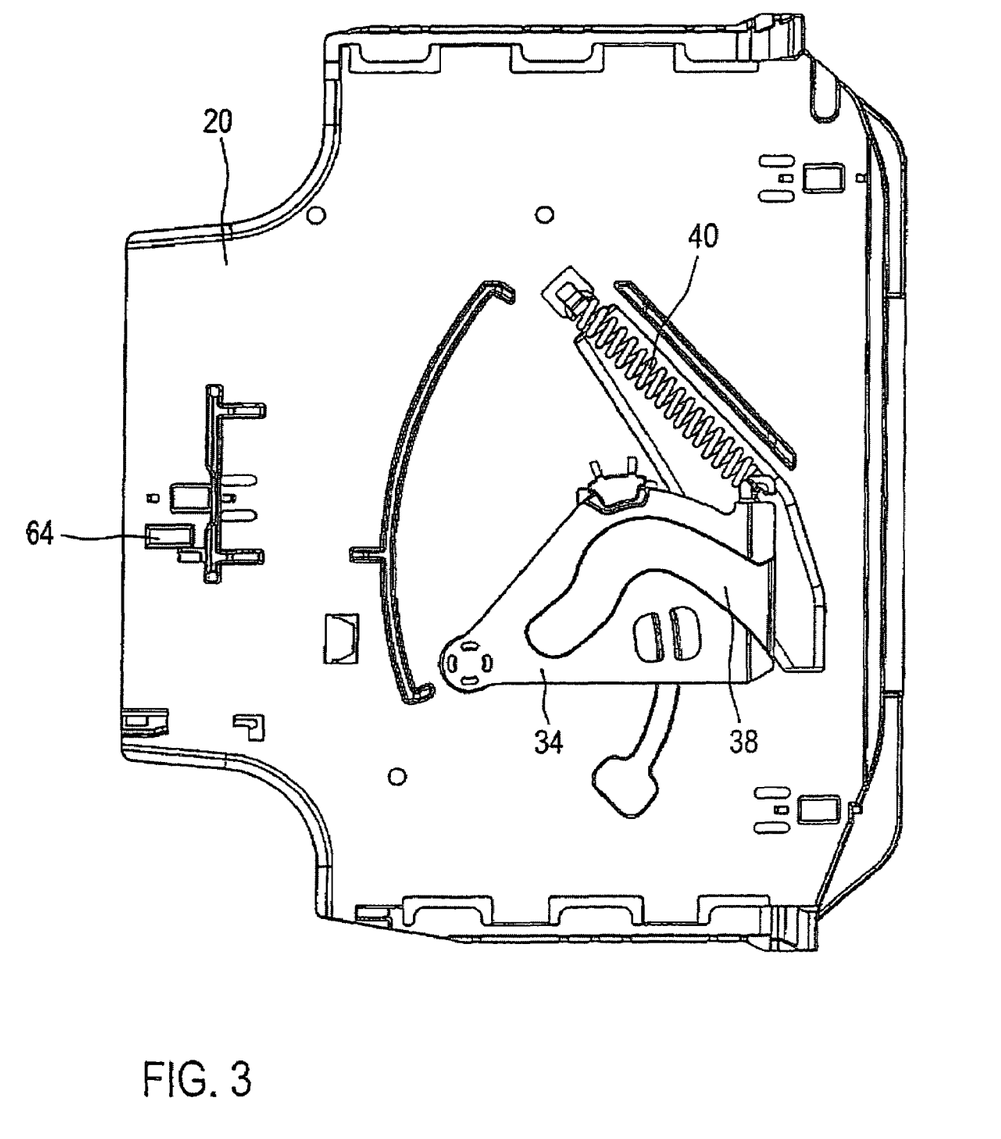
FIG. 3 shows a top view of a support of the magazine.
Figure 5:
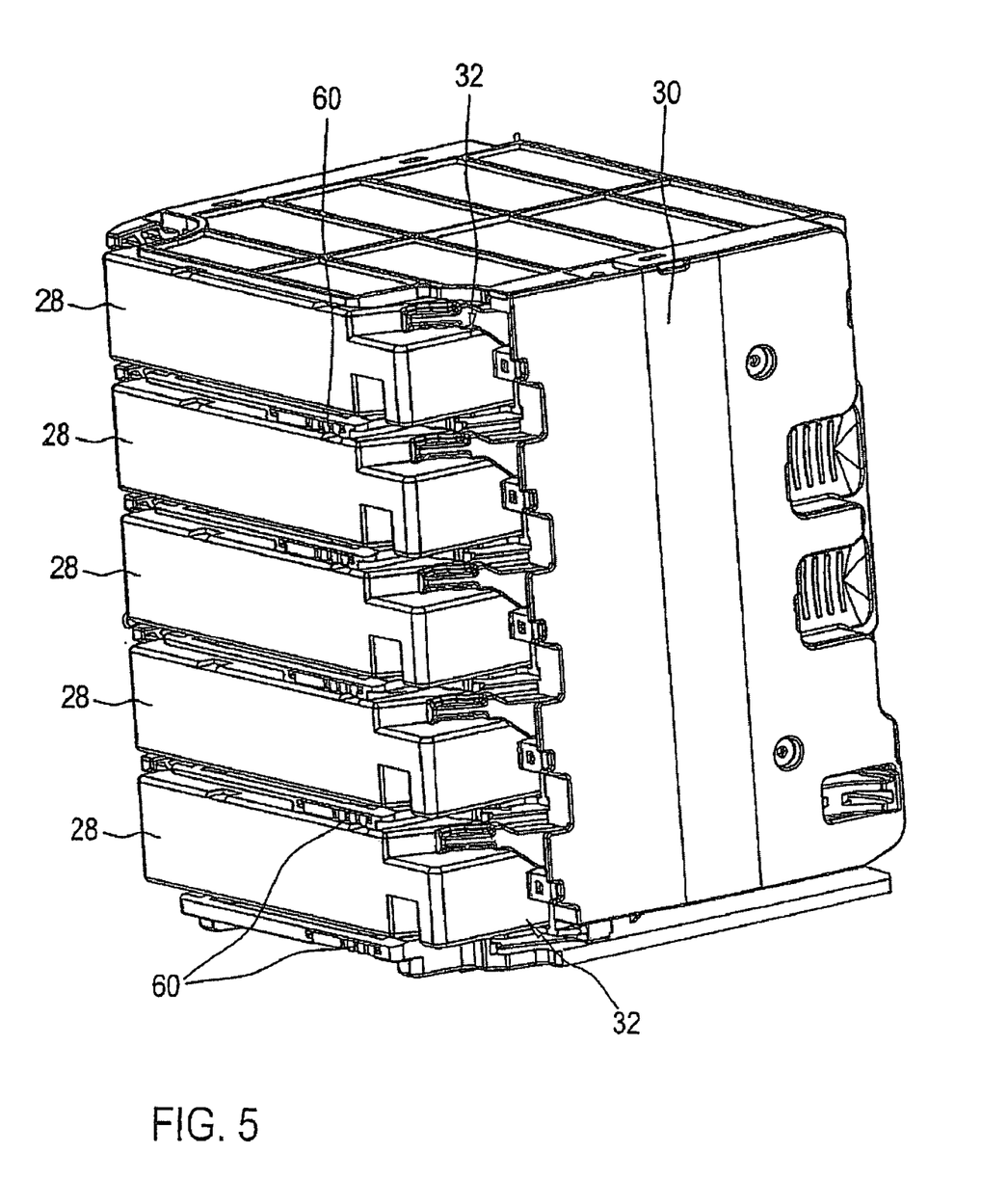
FIG. 5 shows a box of the magazine in an individual depiction.

Boxes 30, having receptacles 32 for cassettes 28, arranged one over the other, can be mounted on the supports 20. One such box 30 is depicted in FIG. 5 in an individual view. The box 30 has an essentially cuboid shape and has five horizontal receptacles 32, arranged one over the other, into which one cassette 28 can be inserted. As can best be seen in FIG. 3, the plate-like supports 20 have a locking lever 34 on their surface that can be pivoted around a pivot point 36 on the surface of support 20. The locking lever 34 is directed from pivot point 36 against the outside of support 20 and has a link groove 38. The link groove 38 is open on the outside of locking lever 34 and runs at an angle against pivot point 36, as is apparent from FIG. 3. A tension spring 40 keeps the locking lever 34 in the position depicted in FIG. 3, in which the open outer end of the link groove 38 is directed against the outside of support 20. The box 30, on its bottom, has a downward protruding link pin. If a support 20 is aligned on the revolving track of a magazine on a door 42 of front wall 12, a box 30 can be introduced into the housing of the device through door 42. The box 30, with its bottom, is then pushed, in the depiction of FIG. 3, from the right onto the plate of support 20. The link pin of box 30 enters the open outer end of link groove 38. Because of the angled oblique trend of the link groove 38, the link pin initially pivots the locking lever 34 against the force of tension spring 40 during insertion of box 30 clockwise, in the depiction of FIG. 3. As soon as the link pin reaches the link grooves 38 via the bending knee, on further pushing of box 30, the tension spring 40 can pivot the locking lever 34 back in the counterclockwise direction, so that the link pin reaches the inner end of link grooves 38. The box 30 is now positioned on support 20 and is held in this position by the locking lever 34. Box 30 can be removed again from support 20 and removed from the housing by pulling box 30 out through door 42. From the tensile force exerted on box 30, the link pin is forced rightward against the oblique intersection of link groove 38 (in FIG. 3), so that the locking lever 34 is again pivoted clockwise against the force of tension spring 40. As soon as the link pin is pulled again over the bending knee of link groove 38, the tension spring 40 can pivot the locking lever 34 back in the counterclockwise direction, so that the link pin reaches the open outer end of the link groove 38, and the box 30 is released from support 20 and can be removed through door 42.

The boxes 30 are arranged on the supports 20 and locked, so that their receptacles 32 are open toward the inside, i.e., toward drives 16. The cassettes 18 are removable from the receptacles 32 and insertable into the receptacles 32 from the inside. Between the side of drives 16, with the cassette shafts facing the front wall 12, and the box 30, with cassettes 28 positioned on the corresponding support 20 on the front wall 12 behind door 42, a free space is provided, in which a robot unit 44 is arranged. The robot unit 44 has a gripper 46 that can grasp the cassettes 28 with its lateral gripping jaws 48. The robot unit 44 also has an elevator 50 that carries gripper 46 and can move it up and down in controllable fashion on the front side of drive 16. For this purpose, the elevator 50 has pinions 52 that can be driven by a motor in controlled fashion, which engage in vertical racks 54 that are arranged on both sides of the cassette shafts, laterally on the front side of drives 16.

The robot unit 44 can position the gripper 46 by means of elevator 60 at a receptacle 32 of box 30, so that a cassette 28 can be removed from receptacle 32 or a cassette 28 inserted into receptacle 32. The gripper 46 can also be positioned, by means of elevator 50, in front of the cassette shaft of a drive 16, in order to insert a cassette 28 into the corresponding drive 16 or remove it from the drive. The method of operation of the gripper corresponds in detail to the prior art, described in DE 100 55 624 C2.

The following expedients are provided, in order to align the robot unit 44, precisely positioned with gripper 46, to the receptacles 32, selected by programming, for changing of the cassette 28:

A sensor unit 46 is arranged on the robot unit 44 on the lower edge of gripper 56 facing the magazine with supports 20. The sensor unit 56 consists of a strip 58 arranged on the horizontal front side of robot unit 44, which carries light transmitters and light receivers spaced in the horizontal direction. Two light transmitters are provided in the practical example, which are designed as light-emitting diodes D1 and D2, especially as infrared diodes. The strip 58 also carries light receivers that are designed in the depicted practical example as phototransistors T1 and T2, which are sensitive to the infrared radiation of diodes D1 and D2. A circuit board, carrying the power supply and circuitry of the sensor unit 56, is also mounted on robot unit 44.

Figure 4:
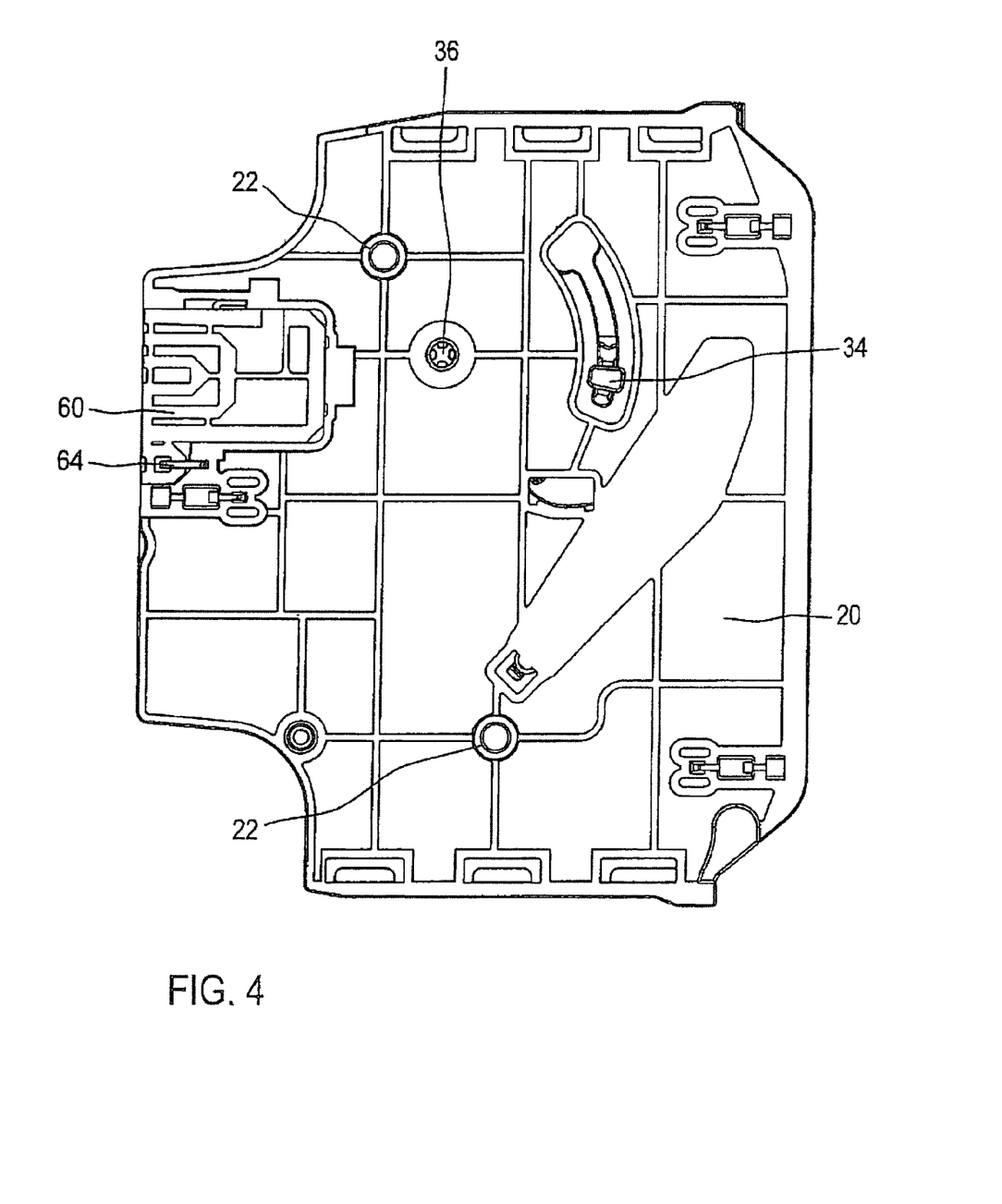
FIG. 4 shows a view of the support from below.

A light guide element 60 is mounted on the bottom of support 20. Corresponding light guide elements 60 are inserted into the bottom surfaces of receptacles 32 of box 30. The light guide elements 60 are preferably injection-molded parts, produced in one piece from a transparent plastic for the light radiation of diodes D1 and D2. The shape of the light guide elements 60 is apparent from FIG. 4. The light guide elements 60 are arranged on the supports 20 and receptacles 32, so that their plane lies parallel to the plane of support 20 and the bottom of the receptacle 32. Light entry surfaces and light exit surfaces of the light guide elements 60 are then arranged on the front edge of support 20 and receptacles 32, directed inward toward the drive 16.

Figure 6:
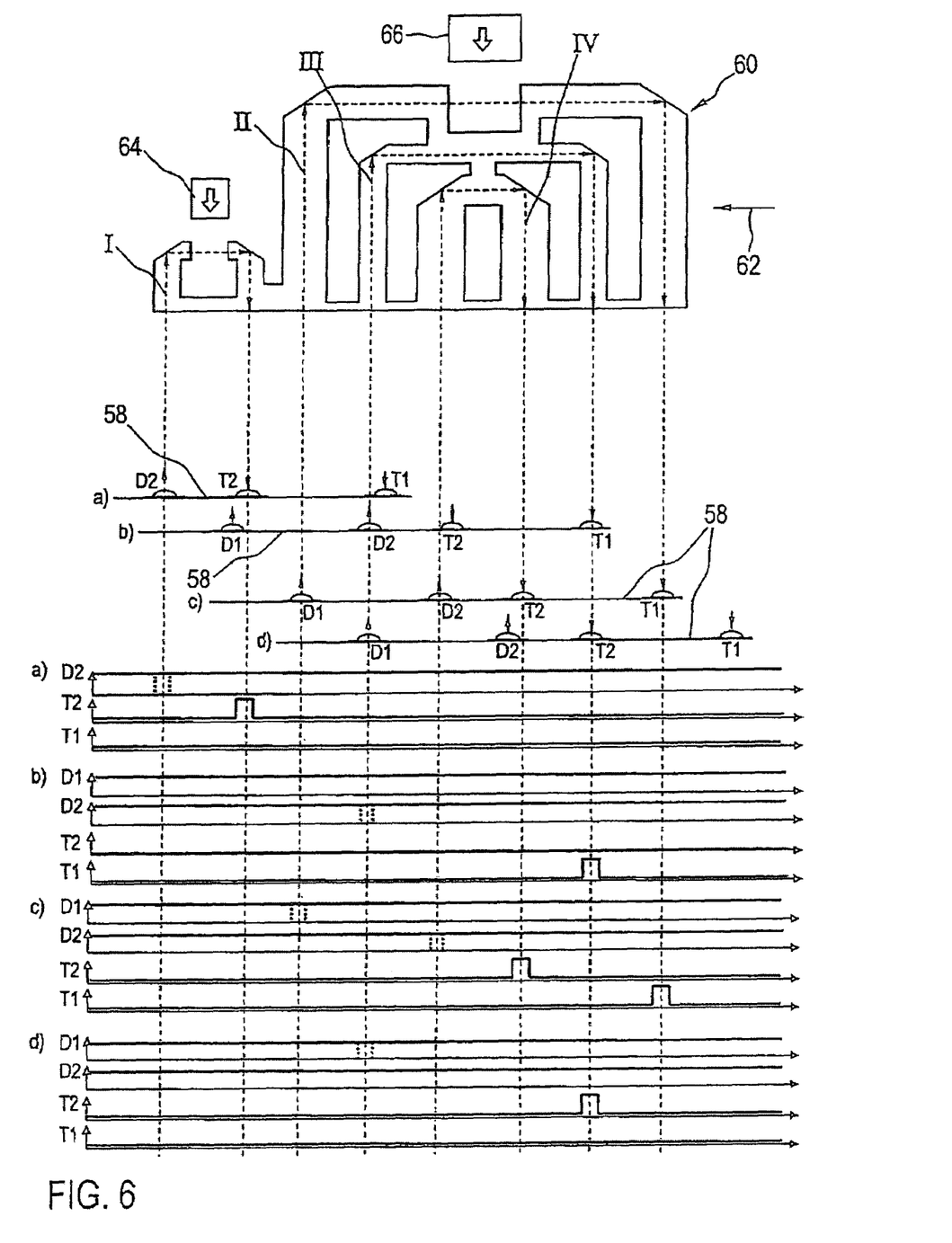
FIG. 6 shows the sensor unit and the light guide element, as well their method of function.

As is apparent from the schematic depiction in FIG. 6, the light guide element 60 forms four light paths I, II, III and IV, each of which lead from a light entry surface to a light exit surface, in which the light, on its way from the light entry surface to the light exit surface, is deflected twice by 90° by prism surfaces arranged at 45°, so that the light beam entering the light entry surface exits again at the light exit surface, parallel to the entry direction. The mutual spacings of the light entry surfaces and light exit surfaces of paths I, II, III and IV are adjusted to the spacings of the diodes D1, D2 and the phototransistors T1 and T2, so that the horizontal spacing of the light entry surface and light exit surface of light path I corresponds to the horizontal spacing of diode D2 and phototransistor T2, the horizontal spacing of the light entry surface and light exit surface of light path II corresponds to the horizontal spacing of diode D1 and phototransistor T2, the horizontal spacing of light entry surface and light exit surface of light path III corresponds to the horizontal spacing of diode D1 and phototransistor T2, and the horizontal spacing of the light entry surface and the light exit surface of light path IV corresponds to the horizontal spacing of diode D2 and the phototransistor T2. The light paths II and III are then arranged symmetrically around a light path IV. The light path I is arranged to the side of light paths II, III and IV. The light guide element 60 has a recess in light path I and light path II that is bounded by surfaces parallel to each other and perpendicular to the direction of the light beam. The light is therefore not adversely affected by this recess of the light guide element on the corresponding light path I or II. If, however, a nontransparent blocking element is inserted into the corresponding recess, the light path is interrupted and the light cannot go from the light entry surface to the light exit surface of the corresponding light path I or II.

The light guide element 60 and the sensor unit 56, as well as the signals generated in the sensor unit, are shown schematically in FIG. 6. The functional process for positioning of receptacles 32 and robot unit 44 is shown. An arrow 62 shows the direction, in which the supports 20 move relative to robot unit 44 during circulation of the magazine.

For positioning, the elevator 50 of the robot unit 44 is initially in the lower end position, in which the strip 58 of sensor unit 56 is situated in the same horizontal plane as the light guide element 60 of support 20. The light guide element 60 moves in the direction of arrow 62, past the strip 58 of sensor unit 46.

The diode D2 and the phototransistor T2 initially cover the light entry surface or light exit surface of light path I. This is shown in FIG. 6 in position a. According to the signal representation a in FIG. 6, the light signal diode D2 therefore generates a received signal in phototransistor T2. This signal is used to identify support 20. A blocking element 64 is inserted in support 20 into the recess of light guide element 60 in light path I. Only with the support 20 marked in this way by the blocking element 64 does no light signal occur in phototransistor T2, if the diode D2 and the phototransistor T2 come to cover the light entry surface and light exit surface of light path I. The support 20 marked in this way is determined in an inventory pass and defines the support no. 1 for numbering and counting of the supports 20 of the magazine.

If the light guide element 60 of the support 20 controlled via the programming is now moved along the sensor unit 56, the diode 22 and phototransistor T1 come to cover the light entry surface and light exit surface of light path III, as shown in FIG. 6 in position b and the corresponding signal diagram. The diode D2 reaches phototransistor T1 via light path III and generates a signal in it. This signal indicates that the target position is approaching support 20. This signal is used to reduce the drive speed of the revolving magazine, when support 20 approaches the target position. Because of this, it is possible to move the magazine, with its relatively high inertia, between the individual positionings with high speed.

Support 20, with light guide element 60, then travels with the now reduced speed into the selected target position, which is established by the fact that diode D2 and phototransistor T2 come to cover the light entry surface and light exit surface of light path IV, so that a signal is generated by diode D2 in phototransistor T2, as shown in FIG. 6 by position c.

Now the selected support and the robot unit 44 are precisely aligned and positioned, relative to each other, in the horizontal circulation direction of the magazine. The elevator 50 of robot unit 44 can then be raised from the base position, in which the strip 58 of the sensor unit is moved past the light guide element 60 of the receptacles 32 of box 30 locked on support 20, lying one on the other. With the light guide element 60 of each receptacle 32, the diode D2 and the phototransistor T2 come to cover the light entry surface and light exit surface of light path IV, so that a position signal is generated in phototransistor T2, as shown in FIG. 6 in signal diagram c. Prepositioning is not required, since the vertical travel paths of the robot unit 44 are small, and therefore no travel speed is necessary. During raising of elevator 50, the receptacles 32 of box 30 can be counted by the signals of light path IV, in order to control the correspondingly programmed receptacle 32.

In this target position c, in which the diode D2 generates a signal in phototransistor T2 via light path IV, the diode D2 and the phototransistor T1 also come to cover the light entry side and light exit side of light path II. This is utilized to determine whether a cassette 28 is found in the corresponding receptacle 32. For this purpose, a blocking element 66 is arranged in each receptacle 32, which is operated by the cassette 28 inserted into receptacle 32 and is inserted into the recess of the light guide element 60 in light path II. The blocking element 66 can be designed, for example, as a lever, which is pivoted into the recess of the light guide element 60 by the inserted cassette 28. If the phototransistor T1 shows no light signal in light path II when the robot unit 44 is positioned at the corresponding receptacle 32, it is reported that a cassette 28 is situated in receptacle 32. If a signal occurs on phototransistor T1, this means that the blocking element 66 is not pivoted into the recess of light guide element 60, and therefore no cassette 28 is situated in receptacle 32.

The blocking element 66 can naturally be moved out in reverse from the recess of light path II by the inserted cassette 28. In this case, interruption of a light path II by the blocking element 66 indicates that no cassettes 28 is situated in the corresponding receptacle 32.

Checking of the individual receptacles 32 for the presence of a cassettes 28 is used, in particular, for making an inventory of the magazine in an inventory pass.

The possibility of query of individual receptacles 32 of box 30 and the possibility of locking box 30 on support 20 releasably leads to extraordinarily high flexibility of the magazine. The user can freely choose how many supports 20 he intends to equip with boxes 30. In addition, the user is free to choose how many receptacles 32 of the corresponding boxes 30 are to be equipped with cassettes 28. Finally, it is possible to store boxes 30 with presently unrequired cassettes 28 separately outside of the device. Likewise, individual boxes 30 can be equipped outside with other cassettes 28 during operation of the magazine.

The diameter of the light cone that impinges on the light entry surfaces of the light guide elements 60 for diodes D1 and D2 and the light-receiving cone of the phototransistors T1 and T2 vary with the distance of strip 58 with these diodes and phototransistors from the entry surfaces and exit surfaces of light guide elements 60. The pulse-shape of the signals of the phototransistors T1 and T2 therefore depends on this spacing. In order to avoid a situation, where different pulse-shapes of phototransistor T2 lead to inaccuracies during positioning via light path IV, the light path III is initially utilized. The precise target position, in which the support 20 is stopped in front of robot unit 44, is calculated from the center of the zone between the descending flank of the signal of phototransistor T1 and light path III in the prepositioning position and the ascending flank of the signal of phototransistor T2 of light path IV in the target position. Since both signals have the same dependence on spacing of strip 58 from light guide element 60, this starting point for positioning is largely independent of fluctuations in this spacing.

If the support 20 travels out of the target position, in order to be brought into a new positioning, a light signal goes from diode D2, via light path III, into phototransistor T1, as shown in position d in FIG. 6. This signal is not required for control and positioning.

It is understandable that light paths I, II, III, IV can be designed in separate light guide elements. Implementation in a single-piece plastic part, however, reduces the manufacturing costs and simplifies assembly.

Although two drives 16 are provided in the depicted practical example, it is readily apparent that the device can also have only one drive 16. Even more than two drives 16 would be possible.

It is also readily apparent that the number of receptacles 32 of the boxes can vary. More than five or less than five receptacles 32 are also possible. It is also readily apparent that the receptacles 32 need not be designed in a box 30 mounted separately on supports 20, but that the receptacles 32 could also be arranged fixed on supports 20.

Positioning according to the invention of sensor unit 56 and light guide elements 60 can also be used, when each support 20 accommodates only a single cassette 28. In this case, an elevator 50 for robot unit 44 is naturally not necessary.

Finally, the positioning according to the invention is also possible, when the cassettes and the drives 16, accordingly, are not arranged horizontal, but are standing on edge.

Finally, the invention is not restricted to the use of magnetic tapes as data carriers, but can also be used in magazines with other data carriers that are accommodated in the receptacles of the magazine.

The drive need not be arranged in the interior of the revolving track of the magazine either. The robot unit can also be arranged on the outside of the revolving magazine. Nor is it necessary that the magazine revolve in a closed track. Finally, no drive need be provided at all. The robot unit can instead transfer the cassettes to a different handling device and accept them from it.

What is claimed is:

1. A device for storage of data on data carriers accommodated in cassettes, with a magazine, having receptacles for the cassettes, and with a robot unit to change the cassettes from the receptacles or into the receptacles, in which the magazine and the robot unit are movable in controlled fashion relative to each other, in order to position the selected receptacle and the robot unit for the change, wherein an optical sensor unit, on the one side, and a light guide element, on the other, are provided for positioning, one of which is arranged on the robot unit and the other on each receptacle, the sensor unit has at least one light transmitter with a light exit and a light receiver with a light entrance, in which the light exit and the light entrance are spaced from each other, the light guide element has at least one entrance and one light exit, having the same mutual spacing as the light entrance and light exit of the sensor unit, in the change position of the receptacle in the robot unit, the light entrances and light exits of sensor unit and light guide element are congruent, so that the light emitted from the light exit of the light transmitter impinges on the light entrance of the light guide element, is deflected in the light guide element to its light exit and is emitted from this light exit to the light entrance of the light receiver, and receiving of the light emitted from the light transmitter in light receiver is used as a positioning signal.

2. A device according to claim 1, wherein the magazine is movable in controlled fashion, the robot unit is arranged fixed, the sensor unit is arranged on the robot unit, and wherein a light element is arranged on each receptacle.

3. A device according to claim 1, wherein the robot unit causes the change between the corresponding receptacle and at least one drive for the data carrier.

4. A device according to claim 1, wherein the magazine revolves on a closed track around the robot unit, and optionally around the at least one drive.

5. A device according to claim 1, wherein the magazine revolves in a horizontal plane and the cassettes are accommodated flat in the receptacles parallel to this plane.

6. A device according to claim 5, wherein the magazine has supports revolving in the horizontal plane, on which at least two receptacles, arranged one on the other, are arranged.

7. A device according to claim 6, wherein at least two receptacles are arranged in a box, one on the other, which is releasably fastened to the support.

8. A device according to claim 6, wherein the robot unit has an elevator for positioning at the receptacles and arranged one on the other.

9. A device according to claim 6, wherein the light transmitters and the light receivers of the sensor unit and the light entry surfaces and light exit surfaces of the light guide elements are arranged in a plane parallel to the revolving plane of support, the light guide elements are passed by the sensor unit in this plane for positioning of supports, and wherein the sensor unit is moved past the receptacles, arranged one on the other, perpendicular to the plane of circulation on the light guide elements of the receptacles for positioning of the robot unit.

10. A device according to claim 1, wherein the at least one light transmitter is a light-emitting diode and the at least one light receiver is a phototransistor.

11. A device according to claim 1, wherein the light guide element has a light path for positioning and an additional light path for prepositioning, in which the sensor unit, during relative movement of the magazine and robot unit, scans the light path for prepositioning before the light path for positioning.

12. A device according to claim 11, wherein the signal for scanning the light path for prepositioning is used for braking or the relative movement of the magazine and the robot unit before reaching the target position.

13. A device according to claim 10, wherein the light guide element has another light path, in addition to the light path, for positioning, which is scanned by the sensor unit in the positioning position, and can be interrupted by a blocking element that indicates the presence or absence of a cassette in the corresponding receptacle.

14. A device according to claim 11, wherein the light guide element has a light path that is scanned by the sensor unit and can be interrupted by an insertable blocking element, in order to mark a selected support of the magazine as initial point for numbering.

15. A device according to claim 11, wherein at least the light paths are designed for positioning and prepositioning in a one-piece light guide element made of transparent plastic.

16. A device according to claim 15, wherein the light path for monitoring of cassettes, and preferably the light path for marking of the support, are also made in one piece in the same light guide element.

17. A device for storage of data on data carriers accommodated in cassettes, comprising:
- a magazine, having receptacles for the cassettes,
- a robot unit to change the cassettes from the receptacles or into the receptacles, in which the magazine and the robot unit are movable in controlled fashion relative to each other, in order to position the selected receptacle and the robot unit for the change,
- an optical sensor unit,
- a light guide element comprising at least one entrance and one light exit, having the same mutual spacing as the light entrance and light exit of the sensor unit, and
- at least one light transmitter with a light exit and a light receiver with a light entrance, in which the light exit and the light entrance are spaced from each other,
- wherein in the change position of the receptacle in the robot unit, the light entrances and light exits of sensor unit and light guide element are congruent, so that the light emitted from the light exit of the light transmitter impinges on the light entrance of the light guide element, is deflected in the light guide element to its light exit and is emitted from this light exit to the light entrance of the light receiver, and wherein receiving of the light emitted from the light transmitter in light receiver is used as a positioning signal.

18. A device according to claim 17, wherein the magazine is movable in controlled fashion, the robot unit is arranged fixed, the sensor unit is arranged on the robot unit, and wherein a light element is arranged on each receptacle.

19. A device according to claim 17, wherein the robot unit causes the change between the corresponding receptacle and at least one drive for the data carrier.

20. A device according to claim 17, wherein the magazine revolves on a closed track around the robot unit, and optionally around the at least one drive.

* * * * *